US005482305A

United States Patent [19]

Jeffries et al.

[11] Patent Number: 5,482,305

[45] Date of Patent: Jan. 9, 1996

[54] SHIFTING MECHANISM AND QUICK RELEASE FOR MULTISPEED WHEELCHAIR

[75] Inventors: Benjamin L. Jeffries, Seattle; Barry Hyman, Bellevue; Matthew A. Shepherd, Seattle; Steven Nguyen, Seattle; Jaures F. Cleofe, Seattle, all of Wash.; Daehwan D. Kim, Aiea, Hi.

[73] Assignee: University of Washington, Seattle, Wash.

[21] Appl. No.: 369,385

[22] Filed: Jan. 6, 1995

[51] Int. Cl.$^6$ .............................. B62M 1/14; B60B 23/04

[52] U.S. Cl. .............................. 280/250.1; 280/304.1; 475/331; 475/319; 301/122

[58] Field of Search .............................. 280/250.1, 304.1, 280/236, 238, 242.1, 249; 475/297, 331, 319; 192/67 R; 297/DIG. 4; 301/111, 112, 121, 122

[56] References Cited

U.S. PATENT DOCUMENTS

| | | | |
|---|---|---|---|
| 870,444 | 11/1907 | Leonard et al. | 475/309 |
| 942,843 | 12/1909 | Potter et al. | 475/254 |
| 2,759,373 | 8/1956 | Orchard | 74/750 |
| 3,563,568 | 2/1971 | Sasse | 280/230 |
| 4,351,540 | 9/1982 | Minnebraker | 280/242 |
| 4,358,126 | 11/1982 | Mitchell et al. | 280/242 |
| 4,360,213 | 11/1982 | Rudwick et al. | 280/250.1 |
| 4,392,690 | 7/1983 | Anderson | 280/250.1 X |
| 4,582,448 | 4/1986 | Costello et al. | 280/250.1 X |
| 4,679,862 | 7/1987 | Luo | 301/122 X |
| 4,727,965 | 3/1988 | Zach et al. | 192/6 |
| 4,762,332 | 8/1988 | Seol | 280/242 |
| 5,160,156 | 11/1992 | Mendon | 280/250.1 |
| 5,167,168 | 12/1992 | Beumer | 74/810.1 |
| 5,184,837 | 2/1993 | Alexander | 280/250.1 |
| 5,246,082 | 9/1993 | Alber | 180/65.5 |
| 5,362,081 | 11/1994 | Beidler et al. | 280/250.1 |

FOREIGN PATENT DOCUMENTS 2588513 10/1985 France .

*Primary Examiner*—Kevin T. Hurley
*Attorney, Agent, or Firm*—Kathleen T. Petrich

[57] ABSTRACT

A new wheel assembly (14), with a gear reducing hub (22), and including a new hand wheel assembly (30) mounted on a hand wheel hub (36) for a manual multispeed wheelchair (10), that has an improved shifting mechanism that allows easy shifting at user's hand level. A shifter (76) is rotated, which axially moves a shift member (52) to couple with drive chock openings (46) in direct drive or a planetary gear system (58) for low gear operation. The new wheel assembly (14) also includes a quick disconnect mechanism for easy change of the wheel assembly (14) from the wheelchair (10) without tools. A torque collar (144), on the inboard side of the hub (22), couples with a sleeve assembly (136) on the wheelchair (10) and allows torque to transfer directly from hub (22) to wheelchair (10).

13 Claims, 5 Drawing Sheets

Fig. 1
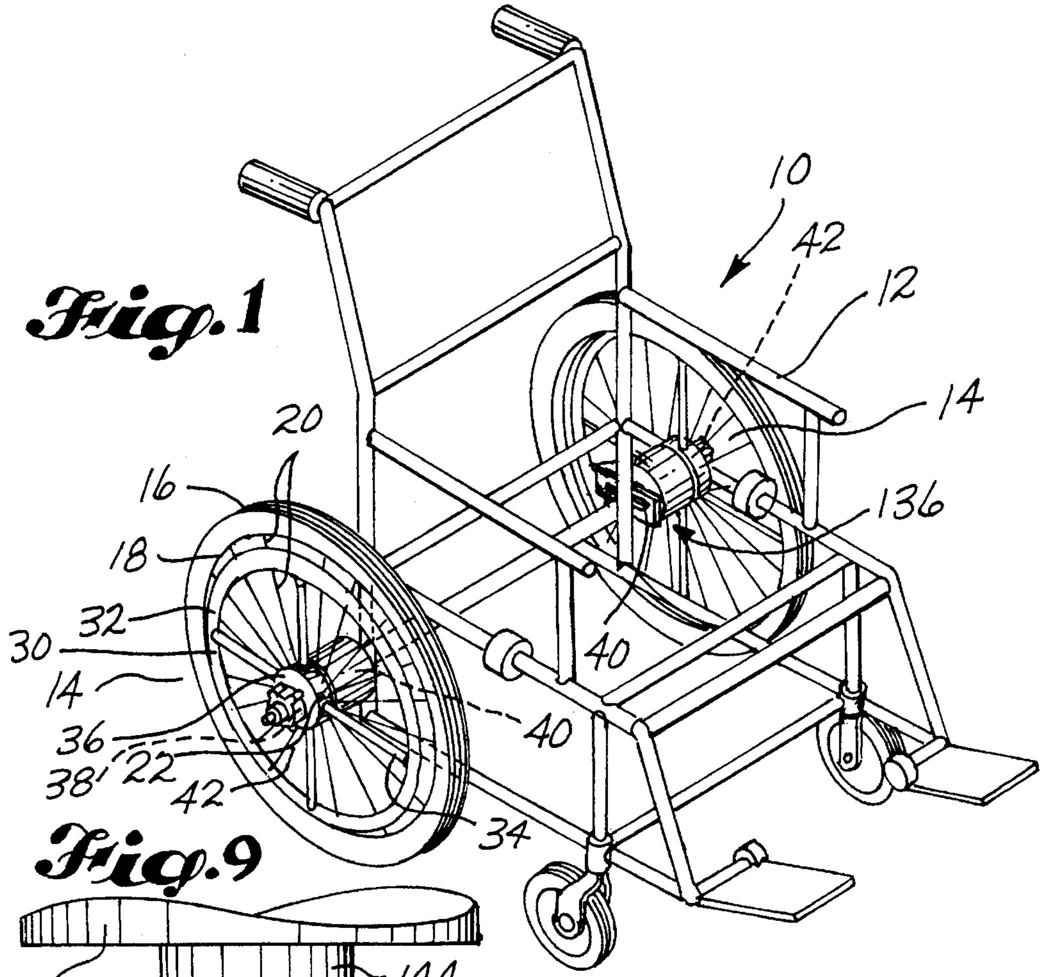
Fig. 9
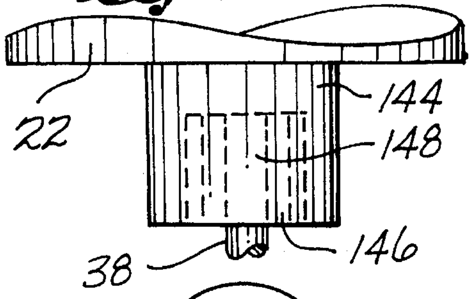
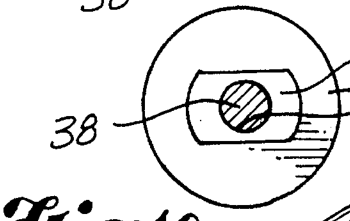
Fig 10
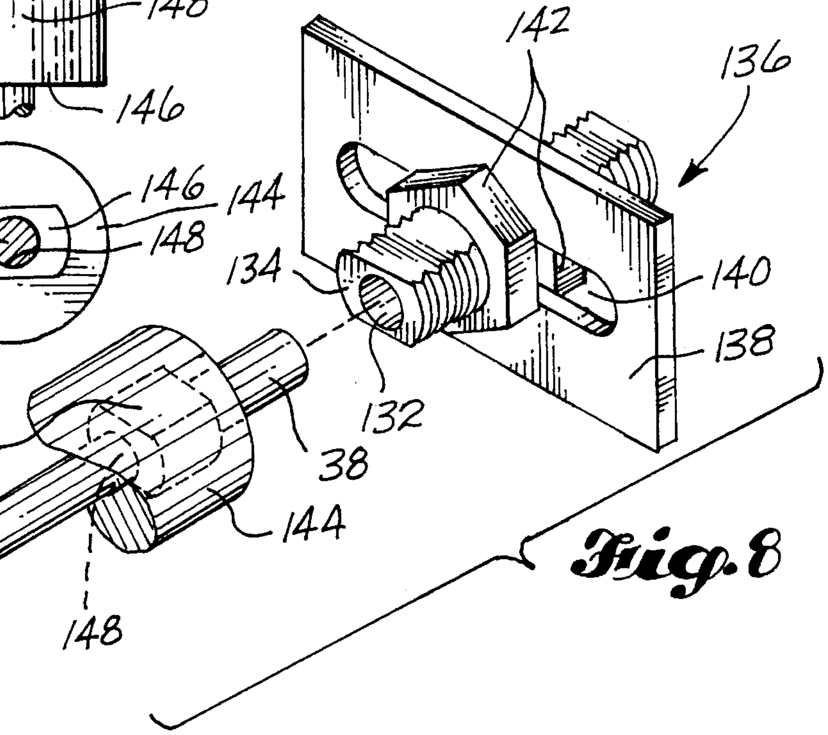
Fig. 8

SHIFTING MECHANISM AND QUICK RELEASE FOR MULTISPEED WHEELCHAIR

TECHNICAL FIELD

This invention relates to a shifting mechanism and quick release mechanism for a manual multispeed wheelchair for ease of shifting and retrofitability of an existing manual wheelchair with a new wheel having a multispeed hub.

BACKGROUND OF THE INVENTION

There are two basic types of wheelchairs, motorized and manual driven. Manual wheelchairs have been well known for many years. Motorized wheelchairs provide the user with more mobility, especially if the user's arm muscles are too weak to drive the wheelchair in a manual mode. The most significant drawbacks of the motorized wheelchair are its weight and lack of portability. Someone who wants to travel with their motorized wheelchair needs a specially designed van and ramp system or lift system to get the motorized wheelchair into the vehicle. In addition, the motorized wheelchair needs a power source, such as a battery which is costly and adds logistic issues of recharging.

Due to the above-cited drawbacks, many individuals opt for a manual wheelchair. The manual wheelchair is lighter and is also less expensive. Another advantage is that a manual wheelchair can be folded, adding to its portability. Individuals who have some type of disability or injury, often still can drive by getting into their car, folding their wheelchair and putting it in their car. The most significant drawback of a manual wheelchair is that it is not easy to use on ramps or steep inclines. A wheelchair with a speed reducer gearing mechanism would aid this problem. U.S. Pat. No. 3,563,568, issued Feb. 16, 1971, to Reuben V. Sasse et al., shows a variable ratio rotary drive mechanism for a wheelchair and provides a basic two-speed wheelchair.

At present, there is a need for an improved and simplified mechanism for shifting such a multispeed wheelchair. The mechanism needs to be close to the user's hand so that it can be shifted with ease. Additionally, it would be desirable to have the ability to easily convert an existing wheelchair into a multispeed chair. This would minimize conversion costs because there would be no need to replace the entire wheelchair frame.

Active wheelchair users may find the need in running errands to take the wheels off of their wheelchair several times in one day. Many wheelchair users find it particularly convenient to have quick release, easily removable wheels. This allows more compact transport and storage of the wheelchair. When using a multispeed hub, it is necessary to transfer torque to the wheelchair frame when in a gear reduction mode. Being able to positively transfer this torque as well as conveniently shift between multiple speeds presents unique challenges if the wheel is to remain quickly releasable and retrofitable to existing wheelchairs without modification. The present inventors believe that these needs have not previously been addressed.

DISCLOSURE OF THE INVENTION

The present invention provides a manual multispeed wheelchair that is readily shifted between a direct drive mode and at least one lower gear mode. The lower gear mode is attained through a planetary gear system inside a tubular hub on which the assembly is mounted. A main axle extends through the hub and wheel assembly to the chair frame. A hand wheel is mounted on a hand wheel hub which is attached to a member that guides the shifting assembly to shift from direct drive to low drive. The shifting assembly includes a shift member including radially extending arms and a hollow hub and a coupling mechanism. The radially extending arms extend into openings between spaced-apart drive chocks inside the hub. The planetary gear system includes a sun gear having a complementary coupling mechanism. The sun gear rotating around the main axle mates with a plurality of offset planetary gears, which in turn drive an outer ring gear which is fixedly attached to the hub and axially spaced from the drive chocks. A shifting assembly, including a rotatable first member and an axially moving second member, moves the shift member from its first position to its second position for the low gear.

In preferred form, the rotatable first member includes a tubular sleeve that has a helical slot. The axially moving second member includes a tubular shift carrier, which mounts inside the hollow hub of the shift member, moving the shift member back and forth along the main axle. The shift member has an opening that holds a retaining pin, which also fits into the helical slot and an elongated slot in the main axle. When the tubular sleeve is axially rotated, the shift pin moves from one end of the elongated slot to the other end, through the helical slot, to move the axially moving second member to the second position coupling the shift member and the sun gear.

Another aspect of this invention includes the quick release mechanism which disconnects or connects the wheel assembly to the wheelchair through its hub. When in connected position, torque is transferred directly from the hub to the chair frame via a torque collar, which has a noncircular cavity that mates with a corresponding noncircular elongated member extending from the chair frame.

Another aspect of the quick release mechanism includes at least one detent member, located inboard of the main axle having at least one opening at the inboard end of main axle, and a quick release shaft, having a detent at its inboard end, and is fully inserted inside the main axle. The detent member is retained by the opening at the inboard portion of the main axle. A release cap abuts the inboard end of the main axle and is adjacent to the detent member. The quick release shaft biases the detent member to extend radially into the opening in the main axle. In this position, the detent is engaged when the main axle is inserted into a hollow opening of the elongated circular member and the elongated circular member mates with the corresponding noncircular cavity of the torque collar. Axial movement of the main axle is blocked from the torque collar to the chair frame.

In preferred form, the elongated noncircular member has two flat oppositely situated sides and the corresponding noncircular cavity also has two oppositely situated flat sides.

In a disconnected position, the outboard end of the quick release shaft is depressed axially inboard. The detent portion of quick release shaft moves towards the release cap and the detent member drops into the detent of quick release shaft allowing axial movement of the main axle. The main axle then can easily slide off the chair frame.

In another preferred form, a spring is inserted between the release cap and the inboard end of the quick release shaft to aid engaging or disengaging the detent member.

An important advantage produced by the present invention is that the manual wheelchair includes an easy shifting mechanism that rotates axially at the user's fingertips to shift from a direct drive to a low gear for ramps and other inclines. Because the shifting mechanism is wholly included on the hub, there is no need to modify the wheelchair frame or to connect any part of the mechanism to the frame. Another advantage is the ease in disconnecting the wheelchair frame from the multispeed wheel assembly via a quick disconnect mechanism. This allows a user to take a manual multispeed wheelchair along with him or her in a car or to be able to make the wheelchair more compact by separating the wheels without tools. Also, existing manual wheelchairs can be easily retrofitted with wheels having a multispeed hub without the use of tools.

These and other advantages and features will become apparent from a review of the following detailed description of the best mode for carrying out the invention, the drawing, and the claims, all which comprise the disclosure of the present invention are included herein by reference.

BRIEF DESCRIPTION OF THE DRAWINGS

Like reference numerals are used to denote like parts throughout the several figures of the drawing, and:

FIG. 1 is pictorial view of a manual multispeed wheelchair with gear reducers in a wheel hub;

FIG. 8 is a pictorial view of a sleeve and a noncircular member coupled with a torque collar, the hub, and the main axle, said axle and said hub are shown in cutaway view;

FIG. 9 is a top view of the hub, the torque collar, and the main axle; and

FIG. 10 is an end view of the torque collar and the main axle.

BEST MODE FOR CARRYING OUT THE INVENTION

Figure 2:
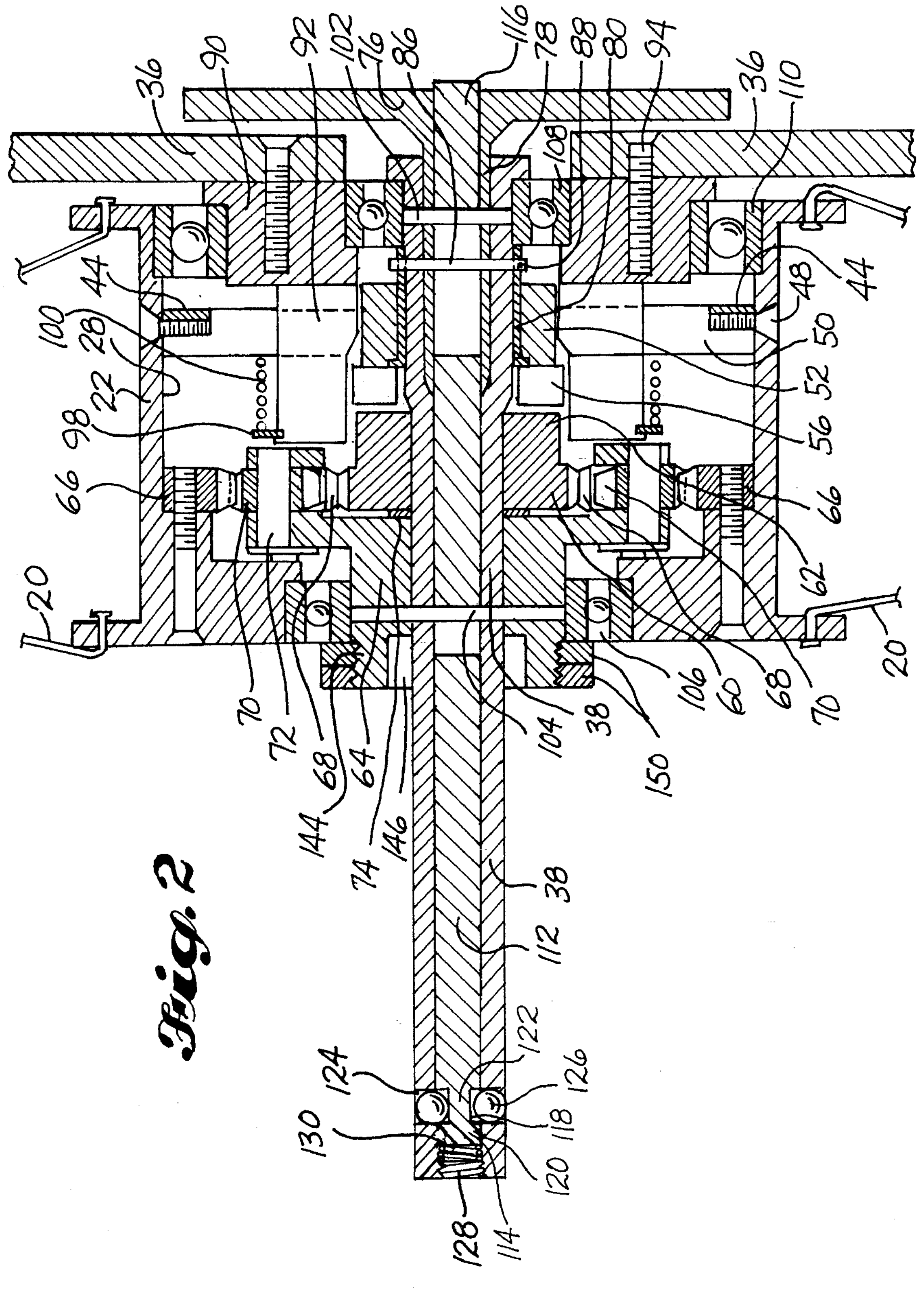
FIG. 2 is a cross-sectional view of a multispeed hub in direct drive and a quick release mechanism with detent in disengaged position.

FIG. 1 depicts a multispeed manual wheelchair 10 according to the present invention having a chair frame 12 and two oppositely mounted wheel assemblies 14. The chair seat is shown removed for clarity. Each wheel assembly 14 includes a tire 16, a rim 18, a plurality of spokes 20 and a hub 22 that houses a reduction assembly.

Figure 5:
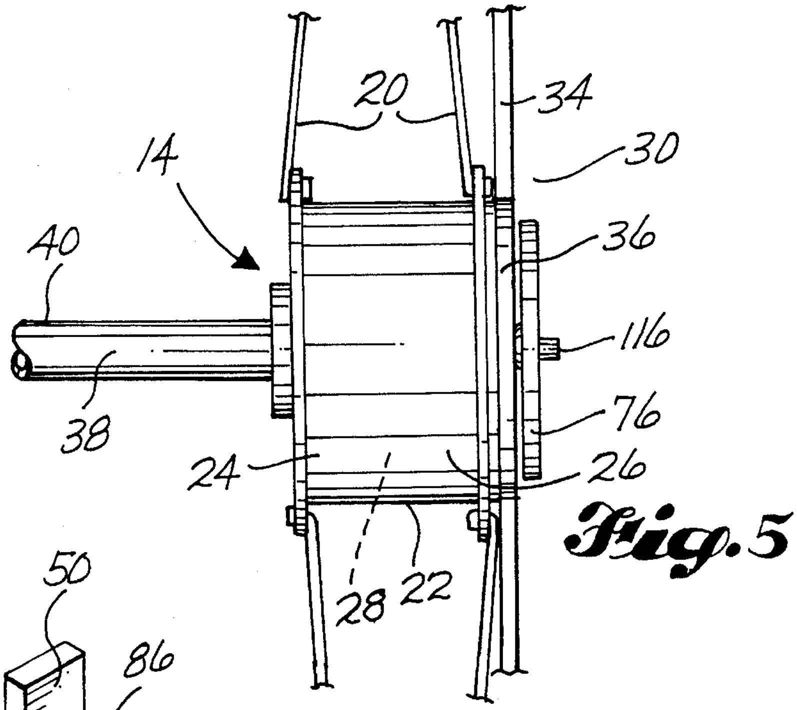
FIG. 5 is a side view of the hub, a plurality of spokes, a hand wheel hub and a plurality of hand wheel spokes.

Referring to FIG. 5, hub 22 has an inboard end 24, an outboard end 26 and an interior 28. The wheel 14 also includes a manually driven hand wheel assembly 30, including a hand wheel rim 32 (shown in FIG. 1) and a plurality of spokes 34, which are mounted on a hand wheel hub 36. The hand wheel assembly 30 is not attached directly to wheel assembly 14, which allows the hub 22 to rotate at a different speed than hand wheel hub 36. Referring again to FIG. 1, a main axle 38 having an inboard end 40 and an outboard end 42 extends through the hub 22 of each wheel assembly 14 to the chair frame 12.

A gear reduction function allows wheelchair 10 to operate in a direct drive mode (1:1), or first position, where hand wheel hub 36 turns at the same speed as hub 22, and a lower gear mode, or second position, where wheel assembly 14 and hub 22 rotate at a slower speed than hand wheel assembly 30. A planetary gear system is used to achieve the lower gear mode. A unique feature of this invention is centered on the compact hub 22, which contains the elements for direct drive and a low gear planetary gear system. It should be noted that this invention could also be used for speed enhancing gearing, which could be used for racing. However, for readability, reference will be made to direct drive and a low gear.

Figure 4:
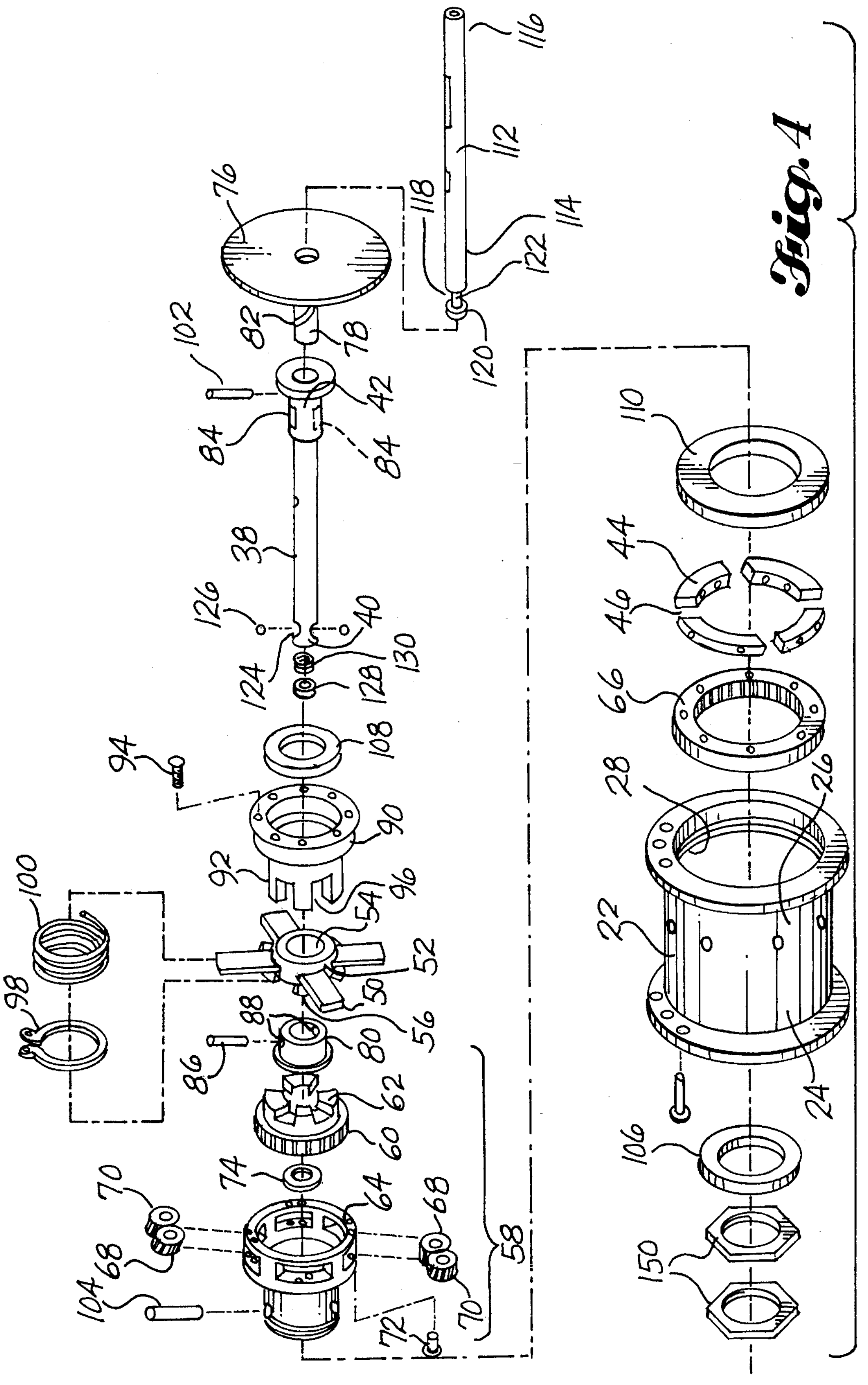
FIG. 4 is an exploded pictorial view of a multispeed hub with the shifting mechanism and the quick release mechanism.

Referring to FIGS. 2 and 4, the first position is accomplished by having a plurality of drive chocks 44 mounted to the hub interior 28. Drive chocks 44 are spaced apart so as to form openings 46 between each drive chock. Drive chocks 44 are fixedly attached to hub interior 28 by a plurality of screws 48; however, other fastening means may be used such as welding or adhesives, or the drive chocks may be integrally molded with the hub or machined out of the hub. A plurality of radially extending arms 50 on a shift member 52 having a hollow hub 54 and a multi-jaw endwall 56 are adapted to fit within openings 46 between drive chocks 44. In preferred form, there are at least four radially extending arms 50; hence, there are at least four drive chock openings 46. However, four are shown for clarity.

Figure 3:
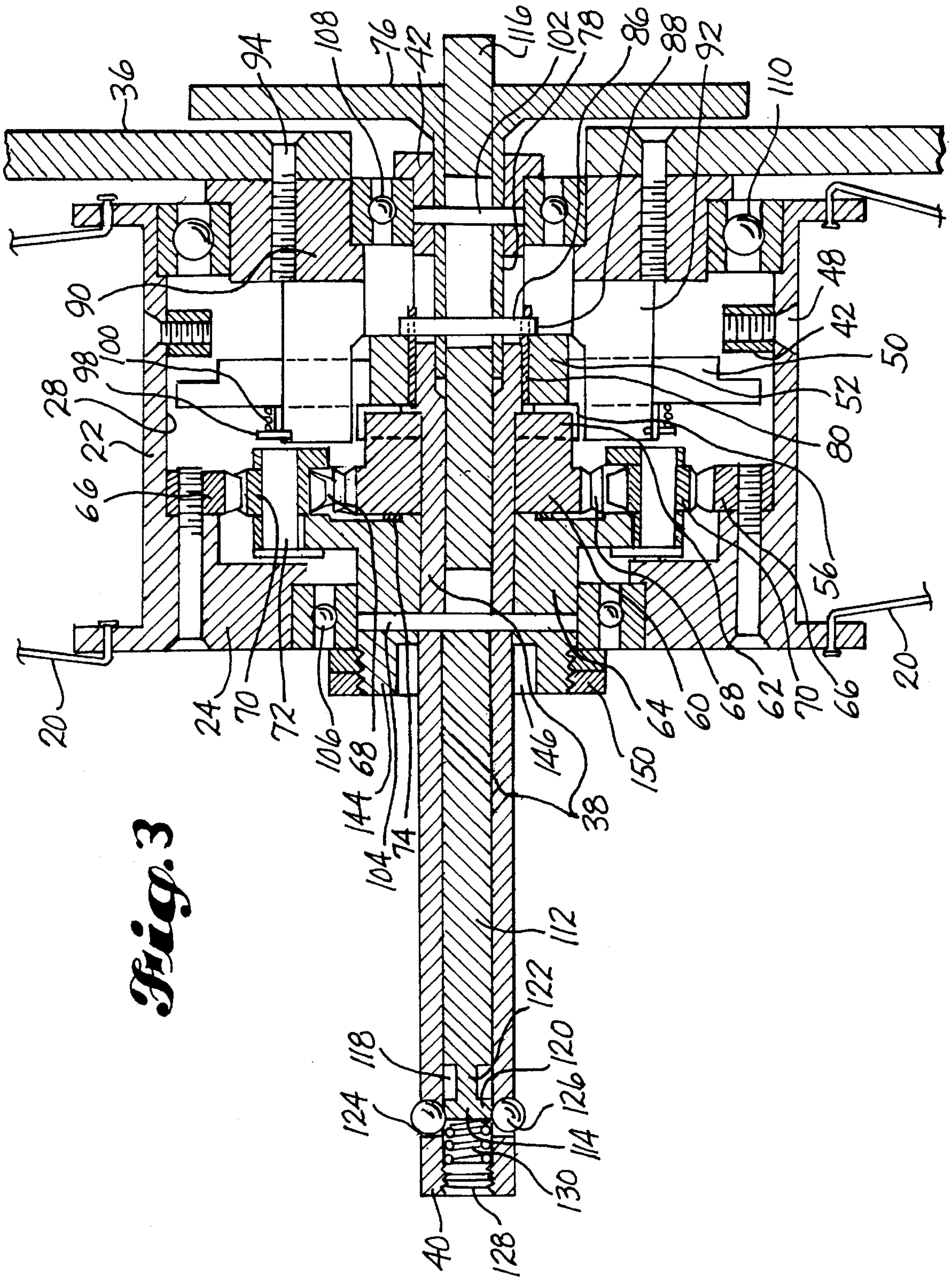
FIG. 3 is the same view as FIG. 2, depicting the hub in low drive and the quick release mechanism with detent in engaged position.

Referring to FIGS. 3 and 4, shift member 52 axially moves along main axle 38 into its second position (low gear). Low gear comprises a planetary gear assembly 58, mounted within interior 28 and spaced axially from drive chocks 44. Planetary gear assembly 58 includes a sun gear 60 having a multi-jaw endwall 62, and a planet cage 64, which is fixedly attached to the main axle 38 for torque support. A ring gear 66 is fixedly attached to the interior 28 of the hub 22. Pinned to planet cage 64 is a plurality of sets of planetary gears. Each set contains an inner planetary gear 68 and slightly offset outer planetary gear 70. In preferred form, there are four sets of planetary gears, which provides good balance. There are only two sets shown in FIG. 4 for demonstration purposes. However, this invention can include fewer or more than four sets of planetary gears.

In low gear, multi-jaw endwall 56 of shift member 52 couples with multi-jaw endwall 62 of sun gear 60. This coupling drives sun gear 60, which drives inner planetary gear 68 and in turn, outer planetary gear 70, which drives ring gear 66 at a slower speed, but with greater torque output, than hand wheel hub 36. A plurality of planet cage retainers 72 are used to pin the inner and outer planetary gears 68, 70 to the planet cage 64; however, other fastening means may be used. In preferred form, a sun washer 74 is positioned between sun gear 60 and planetary gears 68, 70 to reduce friction. A bearing may be substituted for the washer.

Figure 6:
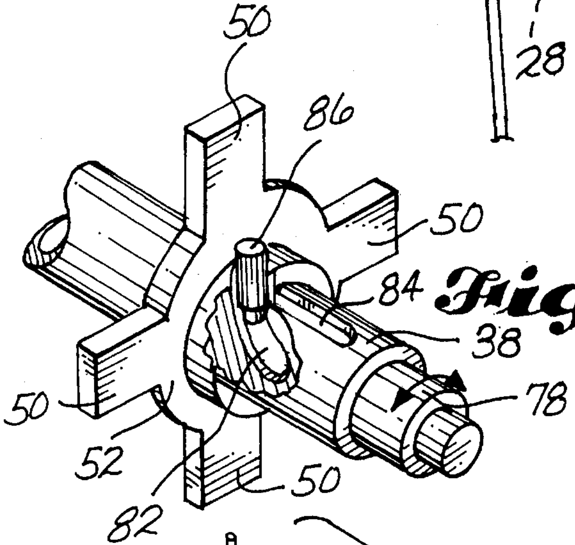
FIG. 6 is a pictorial view of a shifting mechanism with a shifter, a shift carrier, a shift member, a linear slot on the axle, and a retaining pin and a helical slot on the shifter in cutaway view.
Figure 7:
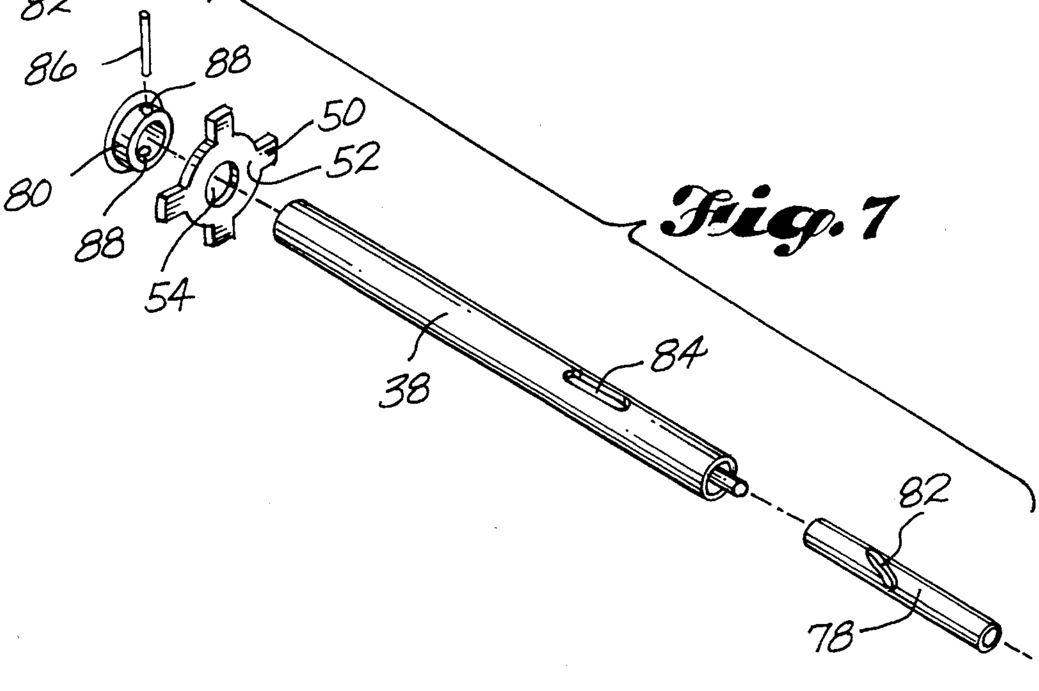
FIG. 7 is an exploded pictorial view of the shift carrier, a shift member, the main axle, and the shifter.

Referring to FIGS. 4, 6 and 7, the axial movement of shift member 52 is accomplished through a rotatable first member and an axially moving second member. In preferred form, the rotatable first member is a shifter 76 having a tubular sleeve 78. The axially moving second member includes a tubular shift carrier 80 that carries shift member 52 axially along main axle 38. Tubular shift carrier 80 is positioned inside hollow hub 54 of shift member 52. Tubular shift carrier 80 moves axially through a slot and pin arrangement. A pair of helical slots 82 are located on tubular sleeve 78. Two elongated linear slots 84 are opposite each other on outboard end 42 of main axle 38. A shift pin 86 extends through two circular openings 88 opposite each other in tubular shift carrier 80, as well as elongated linear slots 84, and helical slots 82. Referring also to FIG. 3, when shifter 76 is axially rotated to low gear, shift pin 86 moves from outboard to inboard as pin 86 simultaneously moves from outboard of helical slots 82 to inboard. Tubular shift carrier 80 moves shift member 52 axially along main axle 38. This axial movement causes shift member 52 to move from first position to second position, where multi-jaw endwall 56 of shift member 52 couples with multi-jaw endwall 62 of sun gear 60.

To return to the first position, shifter 76 is rotated in reverse direction. Shift pin 86 moves from inboard to outboard along elongated linear slots 84 and helical slot 82, causing axial movement of shift member 52. Radially extending arms 50 engage in between drive chocks 44 as shown in FIG. 2. Shifter 76 is located adjacent hand wheel hub 36, and as such, is near the user's hand, facilitating shifting. It should be noted that one elongated linear slot in coordination with one helical slot would still provide sufficient axial movement.

Referring to FIGS. 2–4, hand wheel hub 36 is fixedly attached to a tubular driver 90 having a plurality of elongated guide prongs 92. The driver 90 never moves axially and only rotates within the hub 22. In preferred form, the hand wheel hub 36 is attached to the driver 90 by screws 94, although other fastening means may be used. Elongated guide prongs 92 are spaced apart to define openings 96. Radially extending arms 50 are always guided in openings 96 by guide prongs 92. In preferred form, a retaining clip 98, held in place by a groove (not shown) in guide prongs 92, holds a spring 100, which is located inboard of shifting member 52. Although axial movement between first and second positions is accomplished via the slot and pin arrangement, retaining clip 98 and spring 100 are biased to return shift member 52 to first position in case of shift pin 86 failure. A detent (not shown) retains shift member 52 into second position when in low gear.

Two retaining pins 102 and 104 are positioned to block axial movement. Outboard retaining pin 102 is positioned to prevent axial movement of tubular sleeve 78. In preferred form, tubular sleeve 78 has a slot (not shown) inboard of helical slots 82 to accommodate retaining pin 102. Inboard retaining pin 104 is positioned to prevent axial movement of planet cage 64. Inboard retaining pin 104 also serves to transmit torque between main axle 38 and planet cage 64.

To reduce friction, three bearings are added to hub 22; one inboard bearing 106 and two outboard bearings 108, 110. Small outboard bearing 108 is located between main axle 38 and driver 90. Large outboard bearing 110 is located between driver 90 and hub 22.

Referring to FIGS. 2–4, the invention also includes a toolless means for being able to quickly connect and disconnect wheel assembly 14 from chair frame 12 and still transfer torque directly between the hub 22 and frame 12 when in connected position. The quick release mechanism includes a quick release shaft 112, which has an inboard end 114 and an outboard end 116. A groove 118, acting as a detent, is located at inboard end 114, which in preferred form includes an annular endwall 120 connected to quick release shaft 112 via a narrow cylindrical shaft 122. Quick release shaft 112 is positioned inside main axle 38. In preferred form, quick release shaft 112 also includes an elongated slot and another mid-range slot for shift pin 86, retaining pins 102, 104 to extend through. Outboard retaining pin 102 limits the inboard displacement of quick release shaft 112. Inboard pin 104 limits outboard displacement of quick release shaft 112.

In preferred form, main axle 38 has two openings 124 for the detent action at its inboard end. Two detent members 126, which, in preferred form, are steel balls, are located inside inboard end of main axle 38 and are retained by openings 124. Release cap 128 is adjacent and abutting spring 130. Spring 130 is position in between release cap 128 and abutting annular endwall 120. Detent members 126 contact annular endwall 120 or groove 118.

Referring to FIG. 3, to engage the detent, inboard end 114 of the quick release shaft 112 is biased against spring 130 and release cap 128 and forces detent members 126 to extend radially against openings 124. Because detent members 126 are slightly larger than openings 124, the detent members 126 are pushed toward openings 124, but do not go through openings 124.

Referring to FIGS. 1 and –10, when wheel assembly 14 is connected to chair frame 12, inboard portion of main axle 38, including the detent mechanism, are positioned in a hollow cylindrical opening 132 of an elongated noncircular member 134. The elongated noncircular member 134 is attached to chair frame 12 via a sleeve assembly 136, which includes a sleeve 138, an elongated slot 140 for the elongated noncircular member 134 to extend through, and a retaining nut 142 on each side of the sleeve 138. Sleeve assembly 136 is a standard feature on many popular manual wheelchairs. As such, this invention was designed to retrofit the majority of manual wheelchairs.

Torque is directly transferred from hub 22 to chair frame 12 via a torque collar 144, which is inboard of the planet cage 64. Torque collar 144 includes a noncircular cavity 146 and a hollow concentric hole 148 for main axle 38 to extend through. When connected, noncircular cavity 146 couples with corresponding elongated noncircular member 134 which blocks axial movement of main axle 38 from torque collar 144 to the chair frame 12. Torque collar 144 extends outside inboard end 24 of hub 22. At least one retaining nut 150 fits over torque collar 144 and blocks axial movement of inboard bearing 106.

Referring to FIGS. 1, 2 and 8, to disconnect wheel assembly 14 from chair frame 12, outboard end 116 of quick release shaft 112 is depressed axially inboard causing quick release shaft 112 to push against spring 130 and release cap 128. Detent members 126 drop into groove 118, formed by narrow cylindrical shaft 122 and annular endwall 120, and disengages main axle 38 from hollow concentric hole 148. Torque collar 144 slides away from the elongated noncircular member 134 and wheel assembly 14 and chair frame 12 are easily separated.

Two important advantages of this invention are 1) the ease and quickness in shifting from a first position (direct drive) to a second position (low drive) to allow a manual wheelchair user to go up ramps or any inclines easily, and 2) a means for quickly replacing wheels with gear reducing hubs to retrofit existing manual wheelchairs that requires no tools and still transfer torque directly from the hub to the chair frame.

The illustrated and described embodiments are presented by way of example. The scope of protection is not to be limited by these examples. Rather, protection is to be determined by the claims which follow, construed in accordance with established rules of patent claim construction, including use of the doctrine of equivalents and reversal of parts.

What is claimed is:

1. A wheel for a manual multispeed wheelchair, having a direct drive mode and at least one low gear mode, said wheel comprising:

a main axle for mounting the wheel on a wheelchair frame;

a tubular hub on the main axle for carrying the wheel;

a plurality of drive chocks mounted within an interior of the tubular hub and being spaced apart so as to form openings therebetween;

a planetary gear assembly mounted within the interior of the tubular hub and spaced axially from the drive chocks for driving the tubular hub in a low gear mode, the planetary gear assembly including a sun gear having a coupling mechanism;

a shift member movable axially along the main axle between a first position for engaging the drive chocks and a second position for engaging the sun gear, the shift member including a plurality of radially extending arms adapted to fit into the openings between the drive chocks with the shift member in a first position direct drive, and the shift member also including a complementary coupling mechanism adapted to couple with the coupling mechanism of the sun gear with the shift member in a second position low gear, a hand wheel mounted on a hand wheel hub for driving the shift member; and a shifting assembly, including a rotatable first member and an axially moving second member, whereby rotation of the first member causes the second member to move the shift member between its first and second positions.

2. A wheel according to claim 1, wherein the shifting assembly includes a slot and pin arrangement further comprising:

said rotatable first member having a tubular sleeve with at least one helical slot, the tubular sleeve being positioned at an end of the main axle having at least one elongated linear slot, the helical slot being positioned adjacent the elongated linear slot; and said axially moving second member includes a shift pin on the shift member extending through the helical slot and the elongated linear slot;

wherein in direct drive, the shift pin positions the shift member in the first position, the radially extending arms of shifting assembly extending into the drive chock openings;

wherein in a lower drive, the rotatable first member axially rotates, the shift pin axially moves to the second position along the helical slot, the axially moving second member moves the shift member into coupling with the sun gear, the shift member drives the sun gear and thereby the tubular hub.

3. A wheel according to claim 1, wherein the coupling mechanism further includes a multi-jaw endwall of the shift member that couples with a multi-jaw endwall of the sun gear.

4. A wheel according to claim 1, further comprising an elongated tubular driver having a plurality of guide prongs fixedly attached to the hand wheel hub, the radially extended arms and the hollow hub being positioned between the guide pins.

5. A wheel for a manual multispeed wheelchair having a chair frame with an elongated noncircular member extending therefrom for mounting a wheel thereon, and a quick release mechanism allowing the wheel to easily disconnect from the chair frame; the wheel comprising:

an elongated main axle having an outboard end and an inboard end, the main axle having at least one displaceable detent member adjacent the inboard end;

a torque collar having a complementary noncircular partial cavity concentric the main axle, the noncircular partial cavity being sized and shaped to mate with the elongated noncircular member; and a tubular hub, the main axle extending through the tubular hub;

wherein in a connected position, the elongated noncircular member of the chair frame can be positioned inside the noncircular cavity of the torque collar, and the torque collar can transfer torque directly from the chair frame to the main axle and the tubular hub; and wherein in a disconnected position, the detent member can be displaced, to allow the tubular hub and the wheel to slide axially off the chair frame.

6. A wheel according to claim 5, wherein the noncircular cavity and the elongated noncircular member has two oppositely situated flat surfaces.

7. A wheel according to claim 5, wherein the elongated main axle is tubular and includes at least one radial opening adjacent the inboard end, and further comprising an elongated quick release shaft having an outboard end and an inboard end with a detent groove at the inboard end, the quick release shaft being positioned in the main axle such that the detent groove is positioned at the inboard end of the main axle, and at least one detent member being retained by the radial opening in the main axle and adapted to fit into the detent groove, wherein when the quick release shaft exerts a force on the detent member, the detent member extends radially outwardly toward the opening in the main axle and when the quick release shaft is moved axially such that the detent groove is aligned with the opening in the main axle, the detent member is displaced by movement into the detent groove.

8. A wheel according to claim 5, wherein a spring is located in between the detent member and the release cap.

9. A multispeed wheelchair having a direct drive mode and at least one lower gear mode, including a wheel assembly mounted on a tubular hub for carrying the wheel, a hand wheel mounted on a hand wheel hub, and an elongated noncircular member having a hollow interior fixedly attached to a chair frame, the wheelchair having a shifting mechanism that moves the wheelchair from its direct drive mode to at least one lower gear mode, and a quick release mechanism for disconnecting the wheel assembly from the chair frame, comprising:

a plurality of drive chocks mounted within an interior of the tubular hub for driving the tubular hub and the wheel in the direct drive mode, the drive chocks being spaced apart so as to form openings between the drive chocks;

an elongated tubular main axle having an outboard end and an inboard end and at least one opening adjacent the inboard end; the main axle extending through the tubular hub;

a planetary gear assembly mounted within the interior of the tubular hub and spaced axially from the drive chocks for driving the tubular hub and wheel in a low gear mode, the planetary gear assembly including a sun gear having a coupling mechanism;

a shift member movable axially along the main axle between a first position for engaging the drive chocks openings and a second position for engaging the sun gear, the shift member including radially extending arms adapted to fit into the openings between the drive chocks in its first position, and the shift member also including a complementary coupling mechanism adapted to couple with the coupling mechanism of the sun gear in its second position;

a shift assembly, including a rotatable first member and an axially moving second member, for moving the shift member between its first and second positions;

a torque collar, concentric with the main axle, having a partial noncircular cavity complementary to the elongated noncircular member;

an elongated quick release shaft having an inboard end and an outboard end and a detent at the inboard end, the quick release shaft being positioned in the main axle such that the detent is positioned at the inboard end of the main axle;

at least one detent member being retained by the opening in the main axle, the detent member adapted to fit in the detent; and a release cap abutting the detent member and the detent adjacent the inboard end of the main axle;

wherein connected position, the detent exerts a force on the detent member, the detent member extends radially outward towards the opening in the main axle, the noncircular member of the chair frame couples with the noncircular cavity of the torque collar, the main axle extends through the hollow interior of the elongated noncircular member, blocking axial movement of the main axle from the torque collar to the chair frame, and the torque collar transfers torque directly from the main axle and the tubular hub to the chair frame; and wherein in disconnected position, a force is applied to the outboard end of the quick release shaft, the detent member drops into the detent, allowing the tubular hub and the wheel to slide off chair frame.

10. A wheelchair according to claim 9, wherein a spring is in between the detent member and the release cap.

11. A wheelchair according to claim 9, wherein the noncircular cavity having two oppositely flat surfaces.

12. A wheelchair according to claim 9, wherein the elongated noncircular member having two oppositely flat surfaces.

13. A wheelchair according to claim 9, wherein the shifting assembly includes a slot and pin arrangement further comprising:

the rotatable first member having a tubular sleeve with at least one helical slot, the tubular sleeve being positioned in an end of main axle having at least one elongated linear slot, the helical slot is positioned adjacent the elongated linear slot; and the axially moving second member having at least one opening, and a shift pin, which is positioned inside the opening in the axially moving second member, the elongated linear slot and the helical slot;

wherein in direct drive, the radially extending arms extends into the drive chock openings; and wherein in a lower gear mode, the tubular sleeve axially rotates, the shift pin axially moves along the elongated linear slot through the helical slot, moving the shift member to the second position, the shift member couples the sun gear, the shift member drives the sun gear and the tubular hub.

* * * * *

UNITED STATES PATENT AND TRADEMARK OFFICE

CERTIFICATE OF CORRECTION

PATENT NO. : 5,482,305

DATED : January 9, 1996

INVENTOR(S) : Benjamin L. Jeffries, et al

It is certified that error appears in the above-indentified patent and that said Letters Patent is hereby corrected as shown below:

Column 6, line 19, "Figs 1 and -10" should be -- Figs. 1 and 8-10 --.

Signed and Sealed this

Twenty-fifth Day of June, 1996

Attest:

BRUCE LEHMAN

*Attesting Officer* *Commissioner of Patents and Trademarks*